US 6,374,976 B1

(12) United States Patent
Alberni et al.

(10) Patent No.: US 6,374,976 B1
(45) Date of Patent: Apr. 23, 2002

(54) HUB CLUTCH ASSEMBLY

(75) Inventors: Fred M. Alberni, Bellevue, WA (US); Joseph J. Maloney, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/675,862

(22) Filed: Sep. 29, 2000

Related U.S. Application Data

(60) Provisional application No. 60/160,232, filed on Oct. 18, 1999.

(51) Int. Cl.[7] ........................... F16D 13/72; F16D 25/08
(52) U.S. Cl. ............................... 192/85 CA; 192/70.12; 192/113.34
(58) Field of Search ..................... 192/85 CA, 113.34, 192/70.12, 110 B

(56) References Cited

U.S. PATENT DOCUMENTS

| | | | | |
|---|---|---|---|---|
| 3,038,575 A | * | 6/1962 | Hansen | 192/85 CA |
| 3,571,884 A | | 3/1971 | Chung | 29/200 |
| 3,804,219 A | * | 4/1974 | Cummings | 192/85 CA X |
| 3,805,933 A | * | 4/1974 | Pray | 192/85 CA |
| 4,000,793 A | | 1/1977 | Chung | 192/105 |
| 4,047,452 A | | 9/1977 | Eddy | 74/752 |
| 4,168,611 A | | 9/1979 | Woyton et al. | 60/413 |
| 4,189,962 A | | 2/1980 | Chung | 74/802 |
| 4,281,565 A | | 8/1981 | Lower | 74/789 |
| 4,411,590 A | | 10/1983 | Meredith | 415/26 |
| 4,574,926 A | * | 3/1986 | Bubak | 192/70.12 X |
| 4,899,861 A | * | 2/1990 | Cummings | 192/110 B X |
| 5,234,090 A | * | 8/1993 | Haka | 192/85 CA X |
| 5,513,728 A | | 5/1996 | Alberni et al. | 188/71.7 |
| 5,577,581 A | * | 11/1996 | Eberwein et al. | 192/70.12 X |

OTHER PUBLICATIONS

"BOSS Transmission Gold and Platinum Series 200KW–500KW" (no date available).
Talco Inc., Rotary Union On–Line Catalog 9300 Rotary Union, "Quality Craftsmanship For Greater Reliability" (no date available).

* cited by examiner

Primary Examiner—Rodney H. Bonck
(74) Attorney, Agent, or Firm—Patrick S. Yoder; Alexander M. Gerasimow; William R. Walbrun

(57) ABSTRACT

A power transmission assembly includes a first rotary housing and a second rotary housing disposed within the first housing. A piston housing is disposed between the first and second housing and does not rotate. A clutch plate stack is disposed adjacent to the piston assembly and is engageable to prevent relative rotation of the first and second housings with respect to one another. The rotary housings are supported by a bearing between the housings at one end, and by a series of bearings between the housings and the piston assembly at an opposite end. The arrangement enables the assembly to be supported as an overhung load, while actuating fluid is applied to the piston assembly via a non-rotating manifold.

20 Claims, 7 Drawing Sheets

HUB CLUTCH ASSEMBLY

CROSS REFERENCE TO RELATED APPLICATIONS

The present is based upon a provisional patent application filed on Oct. 18, 1999 under Ser. No. 60/160,232, entitled "Hub Clutch Assembly."

BACKGROUND OF THE INVENTION

1. Field of the Invention

The present invention relates generally to a fluid-actuated hub clutch for use in rotary mechanical transmission and drive systems. More particularly, the invention relates to a clutch device which can be interposed between driving and driven elements, such as on the low-speed side of a gear reducer, and which can be actuated, controlled and monitored via structures provided in a compact, self-contained package.

2. Description of the Related Art

A wide range of applications exist in industry for rotary power transmission devices which can be selectively coupled and uncoupled to a driven load. Power transmitted through such systems originates in a prime mover, such as an electric motor or an internal combustion engine. Power is output from the prime mover via a rotating shaft or hub which is, in turn, connected to a driven load. In many applications the torques and speeds output by the prime mover do not consistently match the requirements of the load, requiring a speed reducer between the prime mover and the driven load. Reducers of this type, typically including one or more stages of intermeshing gears, not only serve to adapt the prime mover speed, but amplify the torque output by the prime mover.

In addition to the prime mover and interfacing hardware for linking the prime mover to a driven load, many power transmission systems require the ability to selectively connect and disconnect the prime mover and the load. Various clutch devices have been proposed and are currently in use for this purpose. Depending upon the load requirements (i.e., torques and speeds passed through the clutch), such clutches may be actuated electrically, by pressurized fluid, by centrifugal structures, and so forth. For large or high inertia loads, such as those found in many industrial, material handling, mining, and similar applications, fluid clutches offer significant advantages of enhanced controllability and efficiency.

Rotary power transmission systems employed in many "heavy duty" applications must often respond to additional needs over and above those of simple torque and speed transmission. In particular, where very large loads are to be driven, inertial factors require that the power transmission systems be adapted to start and stop the loads progressively or in various controlled manners. To accommodate such needs, integrated gear reducers and clutch systems have been developed which offer both gear reduction and controllable fluid clutch operation in a single package. One integrated power transmission system of this type is commercially available from Rockwell Automation Power Systems, Dodge CST Division of Seattle, Washington. Systems of this type offer the significant advantage of permitting controlled starting and stopping of high inertial loads. Where desired, they may also be instrumented to provide for monitoring of loads, temperatures, speeds and so forth. Such integrated power transmission systems are particularly well suited to low-speed, high-inertia applications, such as conveyor drives in mining, timber, utility and other industries, as well as to other types of rotary drives such as trommel drives, ball mill drives, and so forth.

While integrated gear reducer and fluid clutch systems are suitable for many applications, in certain situations it would be useful to allow controllable fluid clutches to be installed independently of gear reducers, such as between the gear reducers and driven loads. In particular, there exists a need for a controllable fluid clutch system which can be interposed between a gear reducer coupled to a prime mover, and a driven load, in a separate package from the gear reducer itself. Such clutches would both permnit greater flexibility in the selection of a gear reducer, as well as offer the possibility to retrofit existing systems with the improved clutch, while interfacing the retrofitted clutch with gear reducers and other power transmission hardware already in place.

Existing stand-alone fluid clutch systems are not well suited to satisfying these needs. For example, in one known system, a fluid clutch is interposed on a high-speed side of a gear reducer, and interface with the output shaft of a prime mover, and the input shaft of the gear reducer. The clutch package generally requires alignment of the prime mover shaft and the gear box shaft for proper operation. Moreover, provision of the clutch on the input side of the gear reducer limits the controllability of the power transmission system by interposing the multiple elements of the gear reducer between the controlled clutch and the ultimate load.

Other clutch systems have been proposed and are currently in use in which fluid used to actuate the clutch is channeled through a driven shaft. The shaft may be an integral part of downstream power transmission equipment, such as a belt pulley shaft. The actuating fluid is channeled from the shaft to a piston assembly within the fluid clutch which serves to engage and disengage clutch plates. Such structures are not well suited, however, for use with non-channeled shafts, severely limiting their utility in new and retrofit applications in which associated equipment is supplied with conventional (i.e., non-channeled shafting). Accordingly, there is a need for an improved controllable fluid clutch system in which actuating fluid is not required to be channeled through shafting of associated equipment.

In addition to the foregoing issues with clutched power transmission systems, problems often arise in the mating and mounting of the upstream and downstream power transmission components on either side of a clutch. In certain system designs, the clutch. may even serve to support driving or driven components on an input or output shaft. In such cases, an extremely reliable and solid connection must be made between the supporting shaft and the clutch. In many cases, the mating elements are specifically machined to fit one another, with little interoperability offered between components of other sizes or configurations. There is also, therefore, a present need for an improved system for coupling a hub, such as a clutch hub, to an input or output shaft. There is a particular need for a system which can provide a sufficiently rigid and reliable connection to allow the clutch, and other components where desired, to be supported on the coupled shaft during operation.

SUMMARY OF THE INVENTION

The invention provides a controllable fluid-actuated clutch designed to respond to these needs. The clutch is formed with an inner hub assembly which may serve as either the input to the clutch or the output from the clutch, depending upon the application. The hub assembly is designed to receive conventional shafting, without the need to direct actuating fluid through the shafting. A housing surrounds the inner hub and is designed to be coupled to another transmission element, either an input element or an output element, depending upon the application of the clutch. A clutch plate stack is provided between the hub assembly and the housing assembly. The clutch plates of the stack can be selectively engaged by fluid pressure to cause the housing and hub to rotate together, thereby transmitting power through the clutch. The clutch may also include features on the housing to permit it to be interfaced with specific types of drives, such as external gears, trommel drives and the like. The clutch may also be instrumented to provide monitoring and feedback signals representative of operational parameters of the mechanical and fluid components. The resulting structure is both compact and adaptable to both new and retrofit applications.

The clutch may serve as a coupling element between the driving and driven components. In a preferred configuration, an outer housing rotates with the first of the components, such as an output shaft from a gear box, while the hub rotates with an output shaft, such as a pulley shaft, or other driven load. A stationary, or static, piston housing is coupled to a manifold for routing fluids into and out of the clutch. The piston housing includes passages for actuating fluid used to engage and disengage the clutch plate stack, thereby causing engagement and disengagement of the outer housing with the hub. Additional passages in the manifold are provided for receiving and transmitting cooling fluid to internal regions of the clutch. Bearing assemblies between the outer housing, the piston housing, and the hub, support the housings and hub effectively with one another, providing adequate mechanical support for hanging a load or a prime mover supported on the input or output shaft.

In a presently preferred configuration, the clutch hub may be supported on shafts of various sizes via a tapered bushing and bushing adapter arrangement. The tapered bushing extends between the hub and the support shaft, with a support adapter being provided between the tapered bushing and the shaft for applications where the shaft dimensions do not match those of the inner dimensions of the tapered bushing. The tapered bushing may be installed with the adapter in a hydraulic coupling technique, so as to provide an extremely rigid and reliable connection of the hub and shaft with one another. A single size of clutch or hub may thus be employed with variously sized and configured shafts.

BRIEF DESCRIPTION OF THE DRAWINGS

The foregoing and other advantages and features of the invention will become apparent upon reading the following detailed description and upon reference to, drawings in which.

DETAILED DESCRIPTION OF SPECIFIC EMBODIMENTS

Figure 1:
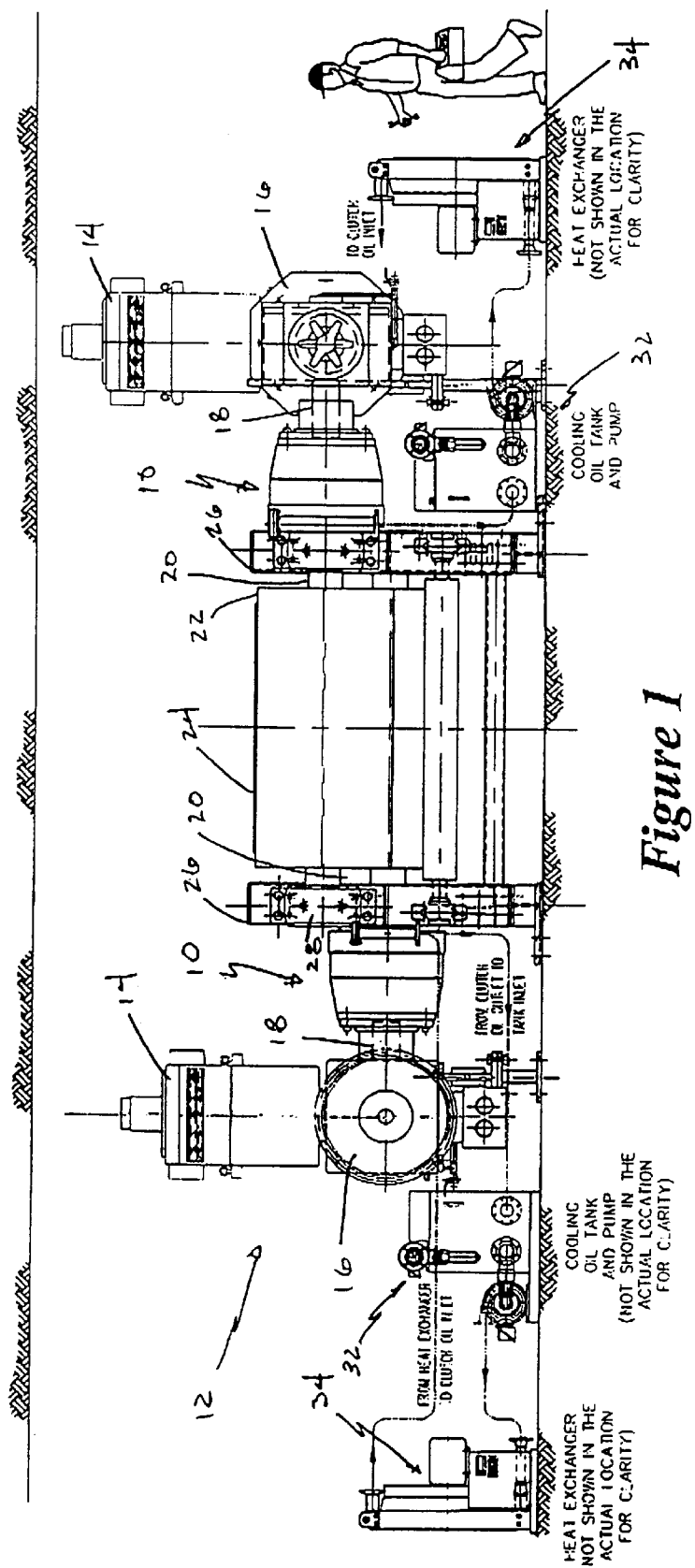
FIG. 1 is an elevational end view of a pair of clutches in accordance with the present technique employed on an exemplary application, notably a conveyor drive.

Turning now to the drawings, and referring first to FIG. 1, a clutch 10 is illustrated in two separate drive systems of a conveyor arrangement 12. Each clutch 10 is secured between driving components and the driven load. In the illustrated embodiment, the driving components include a motor assembly 14, and a gear reducer 16, an output shaft 18 of a gear reducer serving as the input shaft to each clutch. A load shaft 20, serving as an output shaft between each clutch 10 and a pulley 22, also supports the clutch and driving components in the illustrated embodiment. In the conveyor system illustrated, a continuous belt 24 is fed around the pulleys 22 in a conventional manner.

It should be noted that in the present description, reference is made to a conveyor system application for clutch 10. However, the present techniques, structures, and systems may be employed in a wide variety of applications, as well as over a substantial range of ratings and sizes. Moreover, while the present description relates specifically to embodiments in which the clutch is supported on an output shaft as an overhung load, the techniques described herein may also be employed for applications in which one or more of the components is foot mounted, flange mounted, and so forth. The clutch employed in the techniques described herein serves to couple driving and driven components to one another so that the components rotate at approximately the same speed upon full engagement of the clutch. In appropriate applications, the clutch arrangement may also be employed as a brake, with one or more of the input or output components described below being secured against rotation, such that engagement of the clutch causes the other component to be braked to a stop. Similarly, the clutch design described herein may be employed for coupling a gear reducer or other intermediate power transmission component to a driven load, or may be adapted for coupling directly to a prime mover, such as between a motor or engine and a gear reducer.

Figure 2:
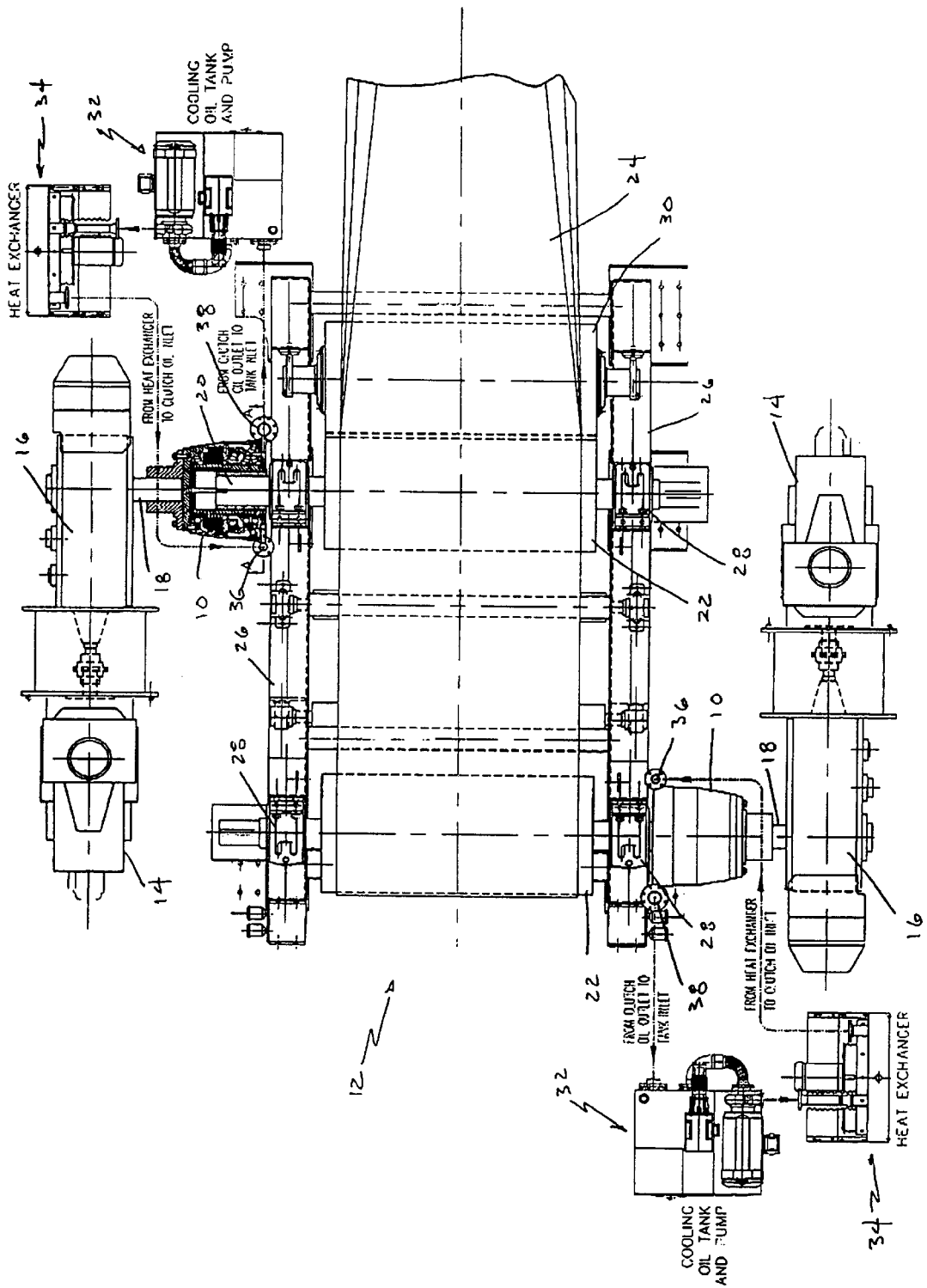
FIG. 2 is a top plan view of the drive shown in FIG. 1.
Figure 3:
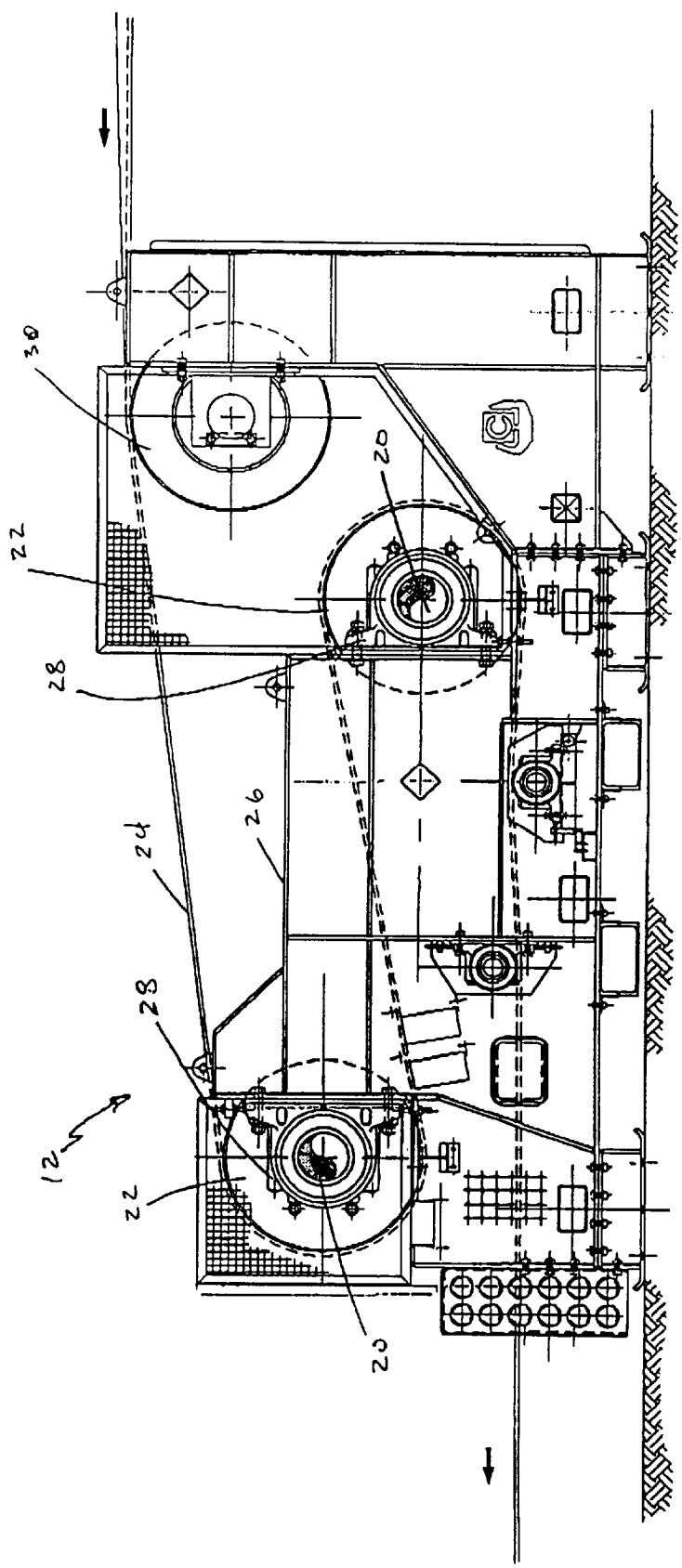
FIG. 3 is a side elevational view of the conveyor drive of FIGS. 1 and 2, illustrating exemplary position and mounting structures for a support shaft driven by the clutch.

As illustrated in FIGS. 1, 2 and 3, the exemplary application in conveyor system 12 supports clutches 10 on a machine frame, designated generally by reference numeral 26. In such applications, bearing assemblies 28 will provide for sufficient mechanical support to allow shafts 20 to rotate freely when driven. Idler rollers 30 (see, e.g., FIGS. 2 and 3) may be provided in the conveyor system, along with one or more driven shafts such as in the illustrated embodiment. In applications where clutches 10 are employed for supporting driving components as an overhung load, the components may be positioned generally perpendicular to the centerline of the rotating components of the clutch, as illustrated. The resulting torque arm configuration is generally completed by one or more anti-rotation elements linked to the overhung load, to prevent rotation of the driving components and clutch, and thereby to transmit torque to the load.

Clutch 10 is preferably cooled and lubricated by auxiliary equipment provided adjacent to the load. In the illustrated embodiment, for example, a cooling oil circulation system 32 is provided for each clutch. As will be appreciated by those skilled in the art, such circulation systems typically include pumps, filters, reservoirs, and so forth, for drawing cooling fluid from the clutch, and returning clean and cooled fluid to the clutch in continuous circulation. A heat exchanger system 34 is coupled to the cooling oil circulation system 32, and extracts heat from the cooling oil before return to the clutch. Flanged cooling oil inlets and outlets are provided as indicated at reference numerals 36 and 38 in FIG. 2, and described more fully below.

Figure 4:
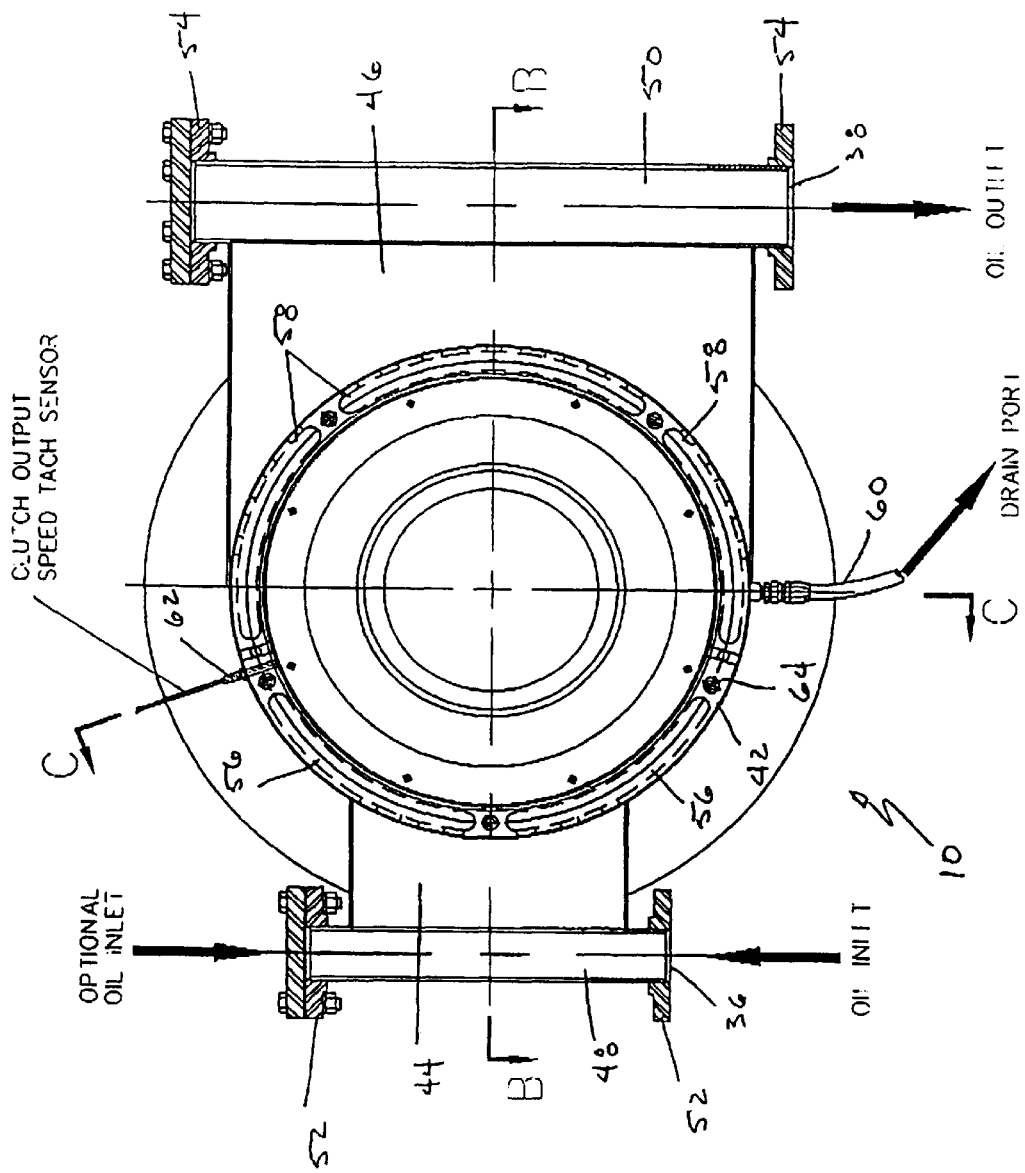
FIG. 4 is a partially sectioned end view of the clutch illustrating passageways for cooling and actuating fluids routed to and from the clutch during operation.

FIG. 4 illustrates a partially sectioned clutch 10 from an end view. Clutch 10 includes an outer housing which rotates with the input shaft as described below. A stationary manifold 42 is supported concentrically within the housing, and serves to direct cooling and actuating fluids to and from the clutch. A box-like fluid conduit 44 is in fluid communication with manifold 42, and is similarly stationary, for directing cooling oil to the clutch. A similar box-like fluid conduit 46 is secured to the manifold and conducts cooling oil from the clutch. An inlet conduit 48 is in fluid communication with conduit 44, and a similar conduit 50 is in fluid communication with conduit 46. Flanges 52 are provided on conduit 48, with similar flanges 54 being provided on conduit 50. Flanges 52 and 54 serve to receive sealed piping or hose assemblies (not shown) for conveying cooling fluid to and from the clutch. Depending upon the location and routing of such fluid, the piping components may be provided on one or both sides of the conduits, with an unused side of the conduit being capped.

Flow conduits 44 and 46 are in fluid communication with slotted routing apertures 56 and 58 of manifold 42. In the illustrated embodiment, for example, two slotted apertures 56 are provided in fluid communication with conduit 44 for receiving cooling fluid and for routing the cooling fluid into internal regions of the clutch as described more fully below. Three similar apertures 58 are provided in fluid communication with outlet conduit 46. An oil drain 60 is provided for collecting and recirculating portions of the cooling fluid which may escape the flow path established by conduit 44 and 46 as described below. In the illustrated embodiment, a speed pickup 62, such as a magnetic or inductive proximity sensor is mounted on the manifold. The manifold assembly may serve to support other instrumentation (not shown), such as temperature sensors, pressure sensors, and so forth. Finally, manifold 42 is provided with one or more ports 64 for receiving actuating fluid used to engage the clutch elements as described below.

Figure 5:
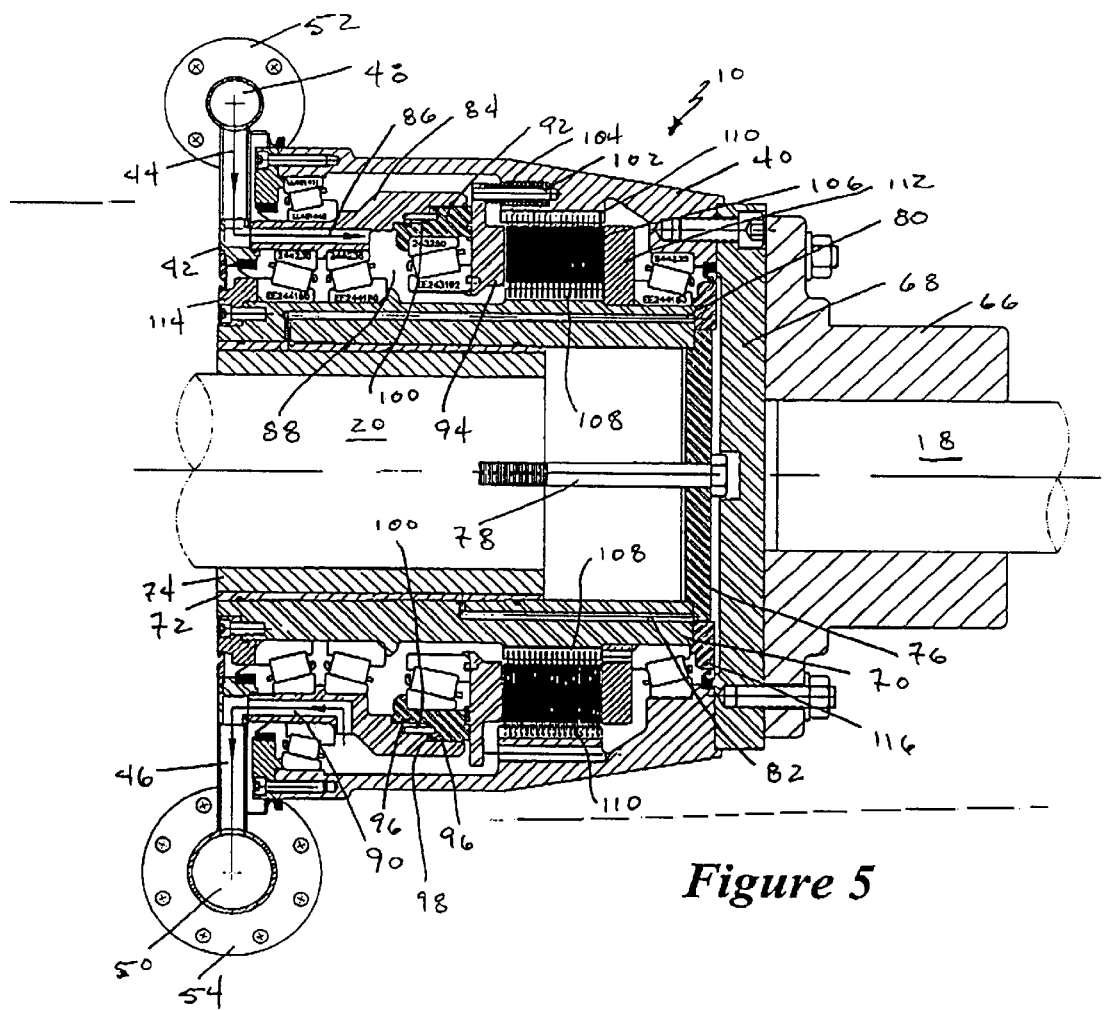
FIG. 5 is a sectional view through line B—B of FIG. 4, illustrating certain of the internal components of the clutch.

FIG. 5 illustrates a sectional view of clutch 10 along line B—B of FIG. 4. As shown in the view of FIG. 5, inlet conduit 48 communicates with flow conduit 44 to introduce cooling oil into the clutch, while conduit 50 communicates with conduit 46 to return oil for filtering and cooling. The conduits are stationary, and coupled to manifold 42. The preferred configuration of the other components secured to the manifold and conduits is described more fully below.

Outer housing 40 is mechanically coupled to shaft 18 via a coupling 66 which, in turn, is bolted to an end plate 68. End plate 68, being fixed rigidly to outer housing 40, causes housing 40 to rotate along with shaft 18 when the prime mover is activated. Shaft 20 is secured to a hub 70, which serves as an output member of the clutch. Hub 70 is mounted coaxially within housing 40, and rotates with housing 40 upon engagement of the clutch as described below.

Various arrangements may be provided for securing the mechanical components, including housing 40 and hub 70 to the input and output shafts. In the illustrated embodiment, hub 70 is secured to shaft 20 via a tapered bushing 72 and adapter ring 74 positioned between the hub and the shaft. The bushing and adapter ring are preferably mounted through a hydraulic coupling technique described in greater detail below. An internal end of hub 70 is capped by a keeper plate 76. A fastener .78 in the illustrated embodiment is used to draw the shaft 20 and hub 70 into an appropriate location with respect to one another during assembly. Fluid conduits 80 and 82 are provided in hub 70 and extend from an annular end of the hub to locations along the hub corresponding to the location of tapered bushing 72 when assembled. As described below, conduits 80 and 82 serve to provide a fluid bearing and to expand hub 70 during installation of the clutch on shaft 20.

A piston housing 84 is secured between outer housing 40 and hub 70, and is rigidly attached to manifold 42. Piston housing 84, like manifold 42, is stationary, and serves both to support the outer housing and hub, and to route fluids for cooling and actuating the clutch. Piston housing 84 thus includes a fluid conduit 86 for routing cooling fluids from conduit 44 into an inner region 88 of the clutch. A similar cooling oil passage 90 formed within the piston housing 84 serves to recuperate cooling fluid and direct the fluid to conduit 46 for removal.

Piston housing 84 also supports an annular piston 92 which is sealed within the housing, but permitted to move axially along the housing for engagement and disengagement of the clutch. Piston 92 is positioned immediately adjacent to a clutch pressure plate 94 of similar annular configuration, and moves the clutch pressure plate axially for clutch engagement and disengagement. The piston 92 is sealed within housing 84 via seal sets 96 bounding a pressure application region or surface 98. A fluid passage (not shown) is provided in piston housing 84, between the actuating fluid inlet port 64 (see FIG. 4) and pressure application surface 98 for introducing and relieving pressurized fluid into the region between the piston housing and the piston.

While being permitted to move axially within the piston housing, piston 92 is prevented from rotating within the housing, thereby providing a non-rotating seal around the piston pressure application surface. In the illustrated embodiment, anti-rotation pins 100 are positioned between the piston and piston housing for preventing such rotation. The clutch pressure plate 94, however, rotates with outer housing 40, by securement to housing 40 via one or more anti-rotation pins 102. One or more return springs 104 are positioned between the clutch pressure plate 94 and the outer housing 40 about pins 102, to force disengagement of the clutch upon relief of pressure from the piston.

The piston housing 84, piston 92, and rotating clutch pressure plate 94 form a system for applying force to a clutch plate stack 106 positioned between outer housing 40 and hub 70. As will be appreciated by those skilled in the art, clutch plate stack 106 includes a series of clutch plates alternatively associated with outer housing 40 and with hub 70. A first of the clutch plates immediately adjacent to clutch pressure plate 94 preferably rotates with housing 40. Each clutch plate includes recesses which mesh with projections or teeth 108 and 110 of the hub and of the outer housing, respectively. A backing plate 112 is positioned immediately adjacent to the last plate in the stack, preferably a plate movable with hub 70.

Figure 6:
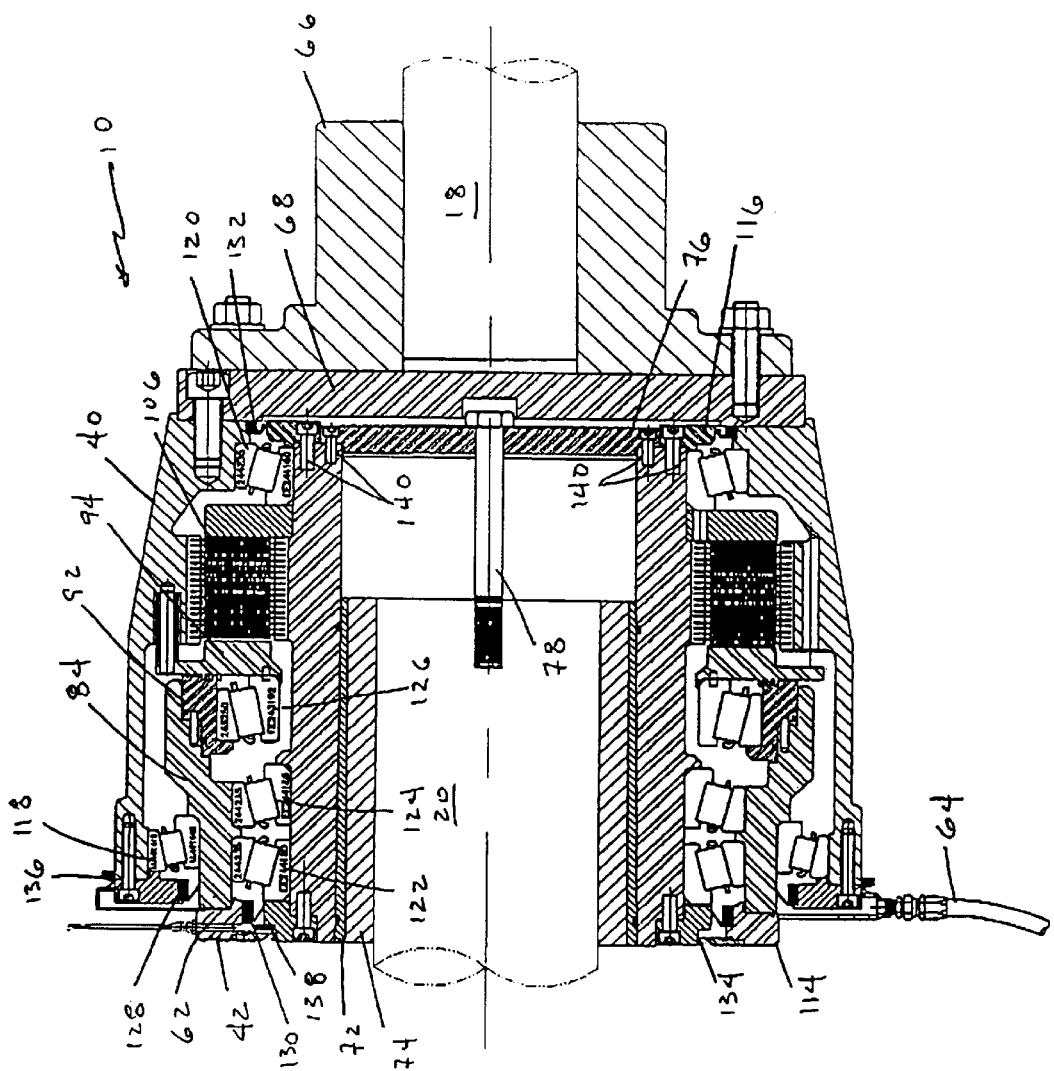
FIG. 6 is a sectional view of the clutch along line C—C of FIG. 4, illustrating additional internal components.

The components set forth above are positioned within an inner region of the clutch between the housing 40 and hub 70, bounded on one end by the manifold and piston housing, and on an opposite end by the keeper plate and end plate. Retaining collars 114 and 116 are positioned on either side of the hub, for retaining bearing assemblies, and for sealing the inner components of the clutch for circulation of cooling fluid therein. In the illustrated embodiment, bearing assemblies are provided for solidly supporting the hub, piston housing, and outer housing on shaft 20, while allowing for free rotation of these components with respect to one another. In particular, as best illustrated in FIG. 6, a first bearing set 118 is positioned between outer housing 40 and piston housing 84 adjacent to one end of the clutch. A second bearing set 120 is positioned adjacent to an opposite end of the clutch, and permits relative rotation between the outer housing 40 and the hub 70. The relatively large spacing between the positions of bearing assemblies 118 and 120 provides excellent resistance to moments applied to the clutch, particularly where the clutch is employed for supporting an overhung prime mover or load. A pair of bearing sets 122 and 124 are positioned between hub 70 and piston housing 84. Finally, an additional bearing set 126 is positioned between the piston 92 and the clutch pressure plate 94, and absorbs loading during actuation of the clutch, while permitting relative rotation between the stationary piston and the rotating clutch pressure plate. In a preferred configuration, fall engagement of the clutch provides some small difference in the input and output speeds between housing 40 and hub 70, thereby maintaining slight relative motion within bearing set 120 to avoid damage to the bearing.

The internal components of clutch 10 are sealed via a series of sealing components positioned between the rotating and non-rotating members. In particular, in the illustrated embodiment, a first seal assembly 128 is provided between housing 40 and piston housing 84, with a similar seal being provided between manifold 42 and collar 114. Another annular seal 132 is provided between housing 140 and collar 116. A further seal 134 is provided between manifold 42 and collar 114. Finally, an external seal 136 is provided between housing 40 and the components defining the external surface of the manifold. The seals thus provide effective isolation of internal regions of the clutch from the outside environment, both precluding the ingress of contaminants, and retaining lubricating and cooling fluid within the clutch. Lubricating fluid which may bypass seal 128 is captured and drained via drain 64. Also visible in FIGS. 6 and 7, where a speed sensor 62 is provided, an appropriate toothed ring 138 may be positioned on collar 114 for providing pulsed signals indicative of the rotational speed of hub 70. Similar arrangements may be provided for reading speeds of the outer housing 40.

As noted above, the foregoing structure provides a clutch assembly which may be coupled directly between a driving shaft and a driven shaft. The clutch housing is extremely compact for the torque and speed ratings of the machine, with fluid passages being defined by the static assembly of the manifold, piston housing, and piston assembly. Moreover, the clutch engagement and disengagement technique provided by the arrangement offers the benefit of positive seals 96 which move only in an axial direction, with no rotary motion between the piston and piston housing. In addition, forces of engagement between the piston and the pressure plate are absorbed by the anti-friction bearing 126 secured between these components. The positioning of the other bearing assemblies thus provides all necessary mechanical support between the outer housing 40, the piston housing 84, and the hub 70, while allowing these components to rotate freely with respect to one another.

Figure 7:
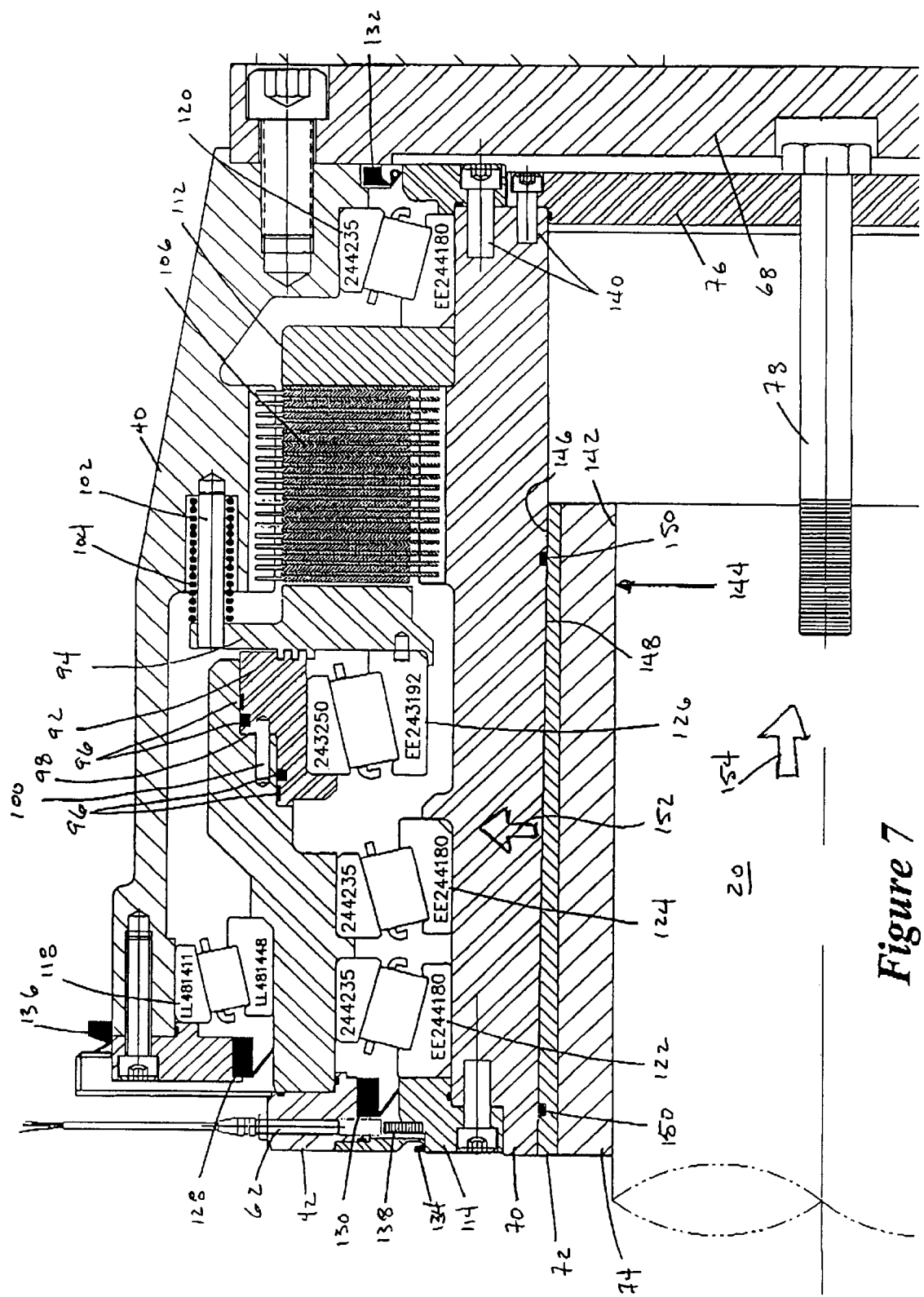
FIG. 7 is an enlarged detailed view of a portion of the clutch illustrated in FIG. 6, showing in somewhat greater detail the internal components, as well as components of the tapered and adapter bushing mounting system.

The embodiment illustrated also facilitates extremely rigid and solid mounting of the hub 70 on the associated shaft 20. FIG. 7 illustrates in somewhat greater detail the exemplary arrangement of these components within the embodiment. In particular, hub 70 has an inner diameter which may be fixed for a range of shaft sizes. In the illustrated embodiment, output shaft 20 is a standard shaft configuration, having a right cylindrical outer surface 142. However, where the shaft outer diameter, indicated by reference numeral 144 in FIG. 7, is smaller than the internal diameter of hub 70, and tapered bushing 72, a combination of a tapered bushing 72 and an adapter ring 74 are employed to secure the components to one another. In the illustrated embodiment, tapered bushing 72 has a tapered outer surface 146 which conforms to a correspondingly tapered inner surface 148 of hub 70. Seals 150 are received in grooves provided in the hub and in the tapered bushing, forming a sealed region therebetween.

For assembly, pressurized fluid is provided in passages 80 and 82 (see FIG. 5), such as via a hand-operated hydraulic pump. The pressure thus is introduced at the interface of the tapered surfaces 146 and 148, between seals 150. With the adapter ring 174 and shaft 20 positioned within the tapered bushing, increasing pressure causes a fluid film to build slightly at the tapered surface interface, expanding hub 70 slightly, but sufficiently for the appropriate positioning of the tapered bushing, adapter ring, and shaft therein. The slight expansion of hub 70, indicated by arrow 152 in FIG. 7, is thus forced during assembly, with the tapered bushing, adapter ring, and shaft 20 being drawn into place, such as by fastener 78 bearing against keeper plate 76, as indicated by arrow 154 in FIG. 7. The components may, of course, be relatively positioned by alternative means, such as hydraulically. When the pressure between the hub and tapered ring is released, the hub contracts elastically back to its original dimensions, resulting in a very tight and rigid fit between the hub, the tapered bushing, the adapter ring 74, and shaft 20. The dimensions of the adapter ring 74 may be selected to provide the desired fit, depending upon the shaft configuration. Thus, clutch 10 may be employed in a variety of applications and on a variety of shaft sizes and configurations, with only the need to appropriately machine the adapter ring for the particular application. As will be appreciated by those skilled in the art, where adapter ring 74 is sufficiently large or rigid, a longitudinal slot or slots (not shown) may be provided partially or fully through the thickness of the ring to allow circumferential constraint of the ring under the force applied by the tapered bushing and hub.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A power transmission assembly comprising:
 a first housing rotatable with a first shaft;
 a second housing disposed within the first housing and rotatable with a second shaft;
 a clutch assembly disposed between the first and second housings and engagable to cause the first and second housings to rotate at generally the same speed; and
 a non-rotating piston assembly disposed between the first and second housings and including a port which receives pressurized fluid for engagement of the clutch.

2. The assembly of claim 1, wherein the piston assembly includes a non-rotating piston housing disposed between the first and second housings, the piston housing channeling pressurized fluid to the piston during operation.

3. The assembly of claim 2, comprising a first bearing assembly disposed intermediate the first housing and the piston housing, a second bearing assembly disposed intermediate the first and second housings, and third and fourth bearing assemblies disposed intermediate the second housing and the piston housing.

4. The assembly of claim 3, wherein first and third bearing assemblies are generally concentrically disposed with respect to one another to transmit loading between the first and second housings via the piston housing.

5. The assembly of claim 1, further comprising a non-rotating manifold ported to direct cooling fluid through an interior volume between the first and second housings.

6. The assembly of claim 1, wherein the second housing includes a hub assembly configured to receive a shaft.

7. A power transmission clutch comprising:
    a first rotary housing;
    a second rotary housing disposed within the first rotary housing;
    a clutch assembly disposed between the first and second rotary housings and engagable to cause the first and second rotary housings to rotate at generally the same speed;
    a non-rotating piston assembly disposed between the first and second rotary housings and including a port for receiving pressurized fluid for engagement of the clutch;
    a first bearing disposed between the first and second rotary housings;
    a second bearing disposed between the first rotary housing and the non-rotating piston assembly; and
    third and fourth bearings disposed between the non-rotating piston assembly and the second rotary housing.

8. The clutch of claim 7, wherein the second and third bearings are disposed generally concentrically with respect to one another to transmit loading between the first and second rotary housings.

9. The clutch of claim 8, wherein the piston assembly includes a non-rotating piston housing and a piston axially movable within the piston housing.

10. The clutch of claim 9, further comprising a fifth bearing disposed between the piston housing and the clutch assembly for exerting an actuating force on the clutch assembly while allowing the piston to remain non-rotating.

11. The clutch of claim 7, comprising a fluid passage extending into the piston assembly for delivery of pressurized fluid to the piston assembly for engagement of the clutch, and wherein a sliding labyrinth seal is formed between the piston and the clutch assembly.

12. The clutch of claim 7, comprising a manifold configured to circulate cooling fluid through the clutch.

13. The clutch of claim 12, wherein the manifold is secured to a housing of the piston assembly.

14. The clutch of claim 13, wherein the manifold is concentric with the second rotary housing.

15. A power transmission assembly configured to be supported on a shaft, the clutch comprising:
    a first rotary housing;
    a second rotary housing rotatably supported within the first rotary housing adjacent to a first end thereof, and
    an engagement assembly interposed between the first and second rotary housings and actuatable to provide substantially no respective rotational velocity between the first and second rotary housings; and
    an actuation assembly interposed between the first and second rotary housings for actuating the engagement assembly, the second rotary housing being supported within the first rotary housing adjacent to a second end thereof opposite the first end via the engagement assembly.

16. The assembly of claim 15, wherein the second rotary housing is supported within the first rotary housing via a first bearing set disposed adjacent to the first end, and the second rotary housing is supported within the second rotary housing via a second bearing set disposed between the first rotary housing and the engagement assembly and by third and fourth bearing sets disposed between the engagement assembly and the second rotary housing.

17. The assembly of claim 15, wherein the engagement assembly includes a piston housing and a piston slidably disposed within the piston housing.

18. The assembly of claim 15, comprising a non-rotating manifold for transmitting actuating fluid to the engagement assembly.

19. The assembly of claim 18, wherein the manifold includes porting for circulating cooling fluid through the assembly.

20. The assembly of claim 15, wherein the engagement assembly includes a plurality of clutch plates interleaved and engageable with one another under the influence of the engagement assembly.

* * * * *